United States Patent [19]

Schupp et al.

[11] Patent Number: 4,543,376
[45] Date of Patent: Sep. 24, 1985

[54] HEAT-CURABLE SURFACE-COATING AGENTS, AND THEIR USE

[75] Inventors: Eberhard Schupp, Schwetzingen; Werner Loch, Erpolzheim; Rolf Osterloh, Gruenstadt; Klaas Ahlers, Muenster, all of Fed. Rep. of Germany

[73] Assignee: BASF Aktiengesellschaft, Fed. Rep. of Germany

[21] Appl. No.: 547,092

[22] Filed: Oct. 31, 1983

[30] Foreign Application Priority Data

Mar. 30, 1983 [DE] Fed. Rep. of Germany ....... 3311518

[51] Int. Cl.$^4$ ............................................. C08L 63/02
[52] U.S. Cl. .................. 523/414; 204/181.7; 523/413; 523/420; 524/514; 524/561; 524/591; 524/601; 524/602; 524/612; 524/901; 525/379; 525/380; 525/381; 525/382; 525/437; 525/438; 525/481; 525/488; 525/523; 525/533
[58] Field of Search ................ 523/414, 420; 524/514, 524/901, 561, 601, 602, 591; 525/437, 438, 481, 488, 379, 380, 381, 382, 523, 533; 528/111, 367; 560/24

[56] References Cited

U.S. PATENT DOCUMENTS

| | | | |
|---|---|---|---|
| 3,994,989 | 11/1976 | Kempter et al. | 260/831 |
| 4,104,147 | 8/1978 | Marchetti et al. | 204/181 C |
| 4,268,683 | 5/1981 | Gurgiolo | 560/24 |
| 4,336,116 | 6/1982 | Schupp et al. | 204/159.11 |
| 4,340,714 | 7/1982 | Schupp et al. | 528/99 |
| 4,362,847 | 12/1982 | Kooijmans et al. | 525/172 |

FOREIGN PATENT DOCUMENTS 12463 6/1982 European Pat. Off. .

Primary Examiner—Theodore E. Pertilla
Attorney, Agent, or Firm—Keil & Weinkauf

[57] ABSTRACT

Heat-curable surface-coating agents useful in organically dissolved baking finishes, for powder coating and for cathodic electrocoating contain, as a binder, a mixture of a polyadduct, polycondensate or other polymer which has an average molecular weight $\overline{M}_n$ of from 500 to 10,000 and, per molecule, on average two or more OH and/or NH groups, and a reaction product of a polyamine which contains on average two or more primary amino groups per molecule and a cyclic carbonic acid ester of the formula (I)

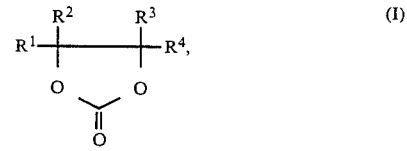

where $R^1$, $R^2$, $R^3$ and $R^4$ each are hydrogen, methyl or ethyl.

8 Claims, No Drawings

HEAT-CURABLE SURFACE-COATING AGENTS, AND THEIR USE

The invention relates to heat-curable surface-coating agents which harden without acid catalysis and without giving off formaldehyde, and to their use.

Aminoplast hardeners, for example urea, melamine or benzoguanamine resins, are known as customary crosslinking agents. They contain methylol or methyloloxy groups. Their effectiveness is tied to the presence of acidic groups in the binder or, at least, to the absence of basic groups, and that not only limits their possible uses but, due to the acid remaining in the film, can also cause corrosion on metallic substrates; in addition, formaldehyde is always given off in the crosslinking reaction, sometimes in considerable amounts.

European Pat. Nos. 12,463 and 40,867 describe heat-curable surface-coating agents which crosslink in the form of a transesterification reaction, without acid catalysis and without giving off formaldehyde. The intended uses mentioned are, inter alia, organically dissolved finishes, powder finishes and cathodic electropaints. To obtain adequate crosslinking in the paint films at hardening temperatures <200° C., the cross-linking agent has to have a sufficient number of β-hydroxy ester groups, which are known to react much more readily than normal ester groups. However, β-hydroxy esters are hydrolysis-sensitive, which causes bath stability problems when the surface-coating agents are to be used as cathodic electrocoating binders.

It is a further, general disadvantage of the surface-coating agents described in European Pat. Nos. 12,463 and 40,867 that the crosslinking reaction results in ester bonds which are relatively hydrolysis-sensitive; this can have an adverse effect on the corrosion protection of the coatings.

It is an object of the present invention to eliminate these disadvantages and to provide novel heat-curable surface-coating agents which can be formulated into organically dissolved baking finishes or powder finishes which harden in the absence of acid without giving off formaldehyde. It is a further object of the present invention to specify heat-curable surface-coating agents which are water-dilutable on neutralization with an acid, which are stable for longer than 3 months in the form of an aqueous dispersion, which can be deposited onto a metallic substrate serving as the cathode, and which can be baked at < <200° C. into surface coatings having excellent corrosion protection.

We have found that these objects are achieved with heat-curable coating agent which contains, as a binder, a mixture of (A) from 1 to 90% by weight of a polyadduct, polycondensate or other polymer having an average molecular weight $\overline{M}_n$ of from 500 to 10,000 and, per molecule, on average two or more OH and/or primary and/or secondary amino groups, and (B) from 99 to 10% by weight of a reaction product of (a) one or more polyamines which on average contain, per molecule, two or more primary amino groups with or without hydroxyl groups, and (b) from 75 to 200 mole %, based on the primary amino groups of component (a), of one or more cyclic carbonates of the formula (I)

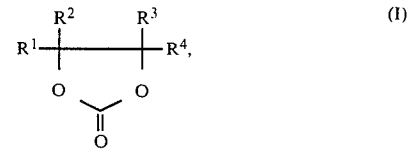

where $R^1$, $R^2$, $R^3$ and $R^4$ are identical or different and each is hydrogen, methyl or ethyl.

Component (A) can preferably be a polyester, a polyacrylate or, in particular, a polyadduct which carries basic nitrogen groups and which contains, bonded to aromatic rings, groups of the formula

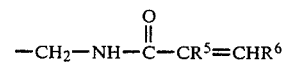

($R^5$ and $R^6$ = H or methyl), a reaction product of phenolic Mannich bases and epoxy resins, or a reaction product of one or more aromatic or aliphatic epoxy resins and one or more primary or secondary amines.

The present invention also relates to the use of the surface-coating agents according to the invention in organically dissolved baking finishes and for powder coating.

The present invention furthermore relates to surface-coating agents of this type which are water-dilutable on partial or complete neutralization with an acid, to the aqueous coating baths which can be obtained therefrom, and to their use for cathodic eletrocoating.

The components from which the surface-coating agents according to the invention are formulated will now be described in detail: (A) Component (A) can be chosen from a very wide range of compound classes. The sole important point is that it has an average molecular weight $\overline{M}_n$ of from 500 to 10,000 and, per molecule, on average two or more OH and/or primary and/or secondary amino groups.

Component (A) should preferably have a resinous character. Examples of suitable materials are polyesters, alkyd resins, polyethers, polyacrylate resins, polyurethanes, polyurethane-ureas, epoxy resins and their reaction products with alcohols, mercaptans or amines. A further suitable class of compounds are polydiene resins or oils, for example polybutadiene oils, into which OH groups can be introduced, for example by adding mercaptoethanol across some of the double bonds. Another way of introducing OH groups into polybutadiene compounds is to react them with maleic anhydride, followed by reacting the product with an OH-containing amine, such as ethanolamine or diethanolamine. The required derivatives can also be obtained by epoxidizing polybutadiene oils with per-acids and reacting the product with an amine.

Examples of suitable polyesters have an average molecular weight $\overline{M}_n$ of from 500 to 10,000 and a hydroxyl number of from 25 to 400 and can be prepared from aliphatic and/or aromatic dicarboxylic acids of 4 to 10 carbon atoms, eg. succinic acid, glutaric acid, adipic acid, pimelic acid, suberic acid, azelaic acid, sebacic acid, cyclohexanedicarboxylic acid, phthalic acid, isophthalic acid or terephthalic acid, or derivatives thereof, and aliphatic diols, such as ethylene glycol, diethylene glycol, triethylene glycol, polyethylene glycol, propanediol, butanediol, hexanediol, neopentylglycol or neopentylglycol hydroxypivalate, and, if appropriate, more than dihydric alcohols, such as trimethylolpropane, glycerol, erythritol, pentaerythritol, trimethylolbenzene or trishydroxyethyl isocyanurate.

Suitable alkyd resins have a similar structure, except that they contain not more than 40% by weight of one or more monocarboxylic acids, for example fatty acids. It is also possible to use alkyd resins which contain glycidyl esters of branched carboxylic acids.

Examples of suitable polyethers are aliphatic and araliphatic polyethers which are obtained by reacting dihydric and/or polyhydric alcohols with various amounts of ethylene oxide and/or propylene oxide.

Suitable polyacrylates are OH-containing polyacrylates having a hydroxyl number of from 25 to 500. They should have an acid number <25, preferably <10, and a Fikentscher K value (3% strength in acetone) of from 10 to 40, preferably from 12 to 25, and can contain the following monomers:

From 10 to 100% by weight, preferably from 20 to 40% by weight, of one or more hydroxy-($C_2$–$C_4$)-alkyl esters of an $\alpha$, $\beta$-ethylenically unsaturated carboxylic acid, for example 2-hydroxyethyl and hydroxypropyl (meth)acrylates or butanediol mono(meth)acrylate, from 0 to 90% by weight, preferably from 60 to 80% by weight, of one or more ethylenically unsaturated carboxyl- and hydroxyl-free compounds, for example vinyl aromatics, such as styrene and vinyl toluene, vinyl esters of carboxylic acids of 2 to 18 carbon atoms, such as vinyl acetate and vinyl propionate, vinyl ethers of monoalkanols of 1 to 18 carbon atoms, such as vinyl methyl ether and vinyl isobutyl ether, esters of acrylic acid or methacrylic acid with $C_1$-$C_{18}$-monoalkanols, corresponding diesters of maleic acid, fumaric acid and itaconic acid, (meth)acrylamide, (meth)acrylonitrile, and mixtures thereof, styrene and (meth)acrylic acid esters being preferred.

Examples of suitable polyurethanes are OH-containing polyurethanes which have a hydroxyl number of from 25 to 600 and are prepared from aliphatic and/or aromatic diisocyanates, eg. from tetramethylene diisocyanate, hexamethylene diisocyanate, isophorone diisocyanate, diphenylmethane diisocyanate, toluylene diisocyanate, naphthylene diisocyanate, diphenyl ether 4,4'-diisocyanate, and any dimers or trimers which can be obtained therefrom, and aliphatic diols, such as ethylene glycol, diethylene glycol, triethylene glycol, polyethylene glycols, propanediol, butanediol, hexanediol, neopentylglycol or neopentylglycol hydroxypivalate and, if appropriate, more than dihydric alcohols, such as trimethylolpropane, glycerol, pentaerythritol, trimethylolbenzene or trishydroxyethyl isocyanurate.

Suitable polyurethane-ureas are corresponding reaction products of said polyisocyanates and said aliphatic diols or more than dihydric alcohols in a mixture with aliphatic diamines, eg. ethylenediamine, propylenediamine, butane-1,4-diamine, pentane-1,5-diamine, neopentanediamine, hexamethylenediamine, diaminocyclohexane, diaminodicyclohexylmethane, 3,3-dimethyl-4,4'-diaminodicyclohexylmethane, 4,9-dioxadodecane-1,12-diamine, and, if appropriate more than difunctional amines, eg. trisaminoethylamine or 1,1,1-trisaminopropoxymethylpropane.

Even pure polyureas, for example prepared from said polyisocyanates and said polyamines, can be used as component (A) in the surface-coating agents according to the invention.

Examples of suitable epoxy resins are glycidyl ethers of the type prepared from 2,2-bis-(4-hydroxyphenyl)-propane and epichlorohydrin. These epoxy resins can have been further modified, for example by having been reacted with polyfunctional alcohols or SH compounds. Examples of polyfunctional alcohols suitable for modifying the epoxy resins are ethylene glycol, propane-1,2-diol, propane-1,3-diol and butane-1,4-diol. If it is desired to prepare relatively flexible coatings, the epoxy resins can also be modified with long-chain polyfunctional alcohols or mercaptans. If the polyfunctional alcohols or mercaptans are used in more than equivalent amounts, based on the number of epoxy groups present, this gives products having terminal OH or SH groups. If, however, they are used in less than equivalent amounts, this gives products having terminal epoxy groups which may be reacted further. The mercaptans react with epoxy groups even in the absence of a catalyst, while the reaction of the alcohols requires the use of a catalyst, for example dimethylbenzylamine, and elevated temperatures (from about 50 to 150° C.).

Reaction products of epoxy resins with primary or secondary amines, in particular with hydroxyl-containing amines, eg. ethanolamine, methylethanolamine and diethanolamine, can likewise be used as component (A).

If component (A) is a product which contains sufficient amino groups to be water-soluble or water-dispersible on protonation with acids, the product can be combined with component (B) to prepare water-dispersible binders for baking finishes, in particular cathodic electrocoating binders. The above reaction products of epoxy resins with primary or secondary amines can be used for this purpose.

Many of the carrier resins proposed for the cathodic electrocoating process can also be used as component (A) in the surface-coating agents according to the invention, namely, for example, the reaction products of phenolic Mannich bases with epoxy resins as described in German Pat. No. 2,419,179, the reaction products of chain-lengthened epoxy resins with secondary amines as described in U.S Pat. No. 4,104,147, or reaction products of (meth)acrylamidomethylated phenols, amines and epoxy resins as described in European Pat. Nos. 27,641 and 41,619 etc., as long as they have an average molecular weight $\overline{M}_n$ of from 500 to 10,000 and, per molecule, on average two or more OH and/or primary and/or secondary amino groups. Although the crosslinking activity in the course of baking is completely adequate if component (A) contains only OH and no primary and or secondary amino groups, it is frequently advantageous to use products which also contain such amino groups, since they can be used to prepare aqueous electrocoating baths of a relatively high pH, for example from 6.5 to 8.0. A high pH, in particular a pH close to 7 or above, helps to prevent corrosion on the electrocoating equipment.

One way of preparing products which have primary and secondary amino groups and which are suitable for use as component (A) is to react excess primary diamines with epoxy resins and then separate off the excess amine at elevated temperatures and under reduced pressure. Diamines suitable for this reaction are especially those of 2 to 6 carbon atoms, for example ethylenediamine, 1,2- and 1,3-diaminopropane, 1,4-diaminobutane, neopentanediamine and hexamethylenediamine. The reaction products can, if desired, be chain-lengthened with dicarboxylic acids, for example with sebacic acid or with a fatty acid dimer. The desired molecular weight can be set via the ratio of dicarboxylic acid to epoxy/amine adduct, for example by employing 1 mole of fatty acid dimer per two molecules of epoxy/amine adduct.

A further way of preparing such products with primary amino groups as are suitable for use as component (A) is to react epoxy resins with secondary amines which contain blocked primary amino groups. Examples of such amines are the diketimine of diethylenetriamine, the ketimine of aminoethylethanolamine, the ketimine of N-methylethylenediamine and the ketimine of N-aminoethylpiperazine. The ketimines can be prepared in a simple manner from the free amines and a ketone, for example methyl isobutyl ketone, namely by separating water out of the refluxing reaction mixture. In the reaction with epoxy resins only the secondary amino group reacts, and subsequently the ketimine can be cleaved by simply adding water to reform the free primary amino group.

These products too can be flexibilized by reacting some of the primary amino groups with dicarboxylic acids to lengthen the chain.

Component (A) is present in the binder mixture according to the invention in an amount of from 1 to 90, preferably from 50 to 85, % by weight, in particular from 65 to 80% by weight. (B) Component (B) is a reaction product of (a) one or more polyamines which contain two or more primary amino groups per molecule, with or without OH groups, and (b) from 75 to 200 mole %, preferably from 100 to 150 mole %, based on the primary amino groups of component (a), of one or more cyclic carbonic acid esters of the formula (I)

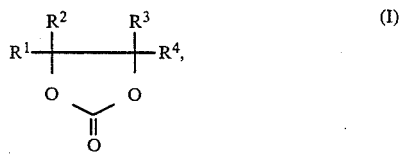

where $R^1$, $R^2$, $R^3$ and $R^4$ are identical or different and each is hydrogen, methyl or ethyl.

Component (B) is present in the surface-coating agents according to the invention in amounts from 10 to 99% by weight, preferably from 15 to 50% by weight, in particular from 20 to 35% by weight.

Any aliphatic or araliphatic polyamine which contains two or more primary amino groups per molecule can be used as polyamine (a). Examples of suitable amines are ethylenediamine, propylenediamine, 1,4-diaminobutane, 1,5-diaminopentane, neopentanediamine, hexamethylenediamine, 4,9-dioxadodecane-1,12-diamine, 4,4'-diaminodicyclohexylamine, 4,4'-bis-(aminoethoxy)-2,2-diphenylpropane, 4,4'-bis-(aminopropoxy)-2,2-diphenylpropane, tris-(aminoethyl)-amine, 1,1,1-tris-aminopropoxymethylpropane, α,β-bis-(aminomethyl)-n-butylamine, tetrakis-(aminomethyl)-methane, tris-(aminoethyl) isocyanurate and tris-(aminomethyl)-benzene, where some of the amino groups in the last six examples can be replaced by OH groups, provided that not less than two primary amino groups are present on average per molecule.

Further examples of suitable polyamines (a) are amide-amines which are obtained, for example, by reacting polycarboxylic acids, eg. phthalic acid, isophthalic acid, terephthalic acid, trimellitic acid, trimesic acid, pyromellitic acid and the like, or anhydrides thereof, with excess diamines, eg. propylenediamine, 1,4-diaminobutane, 1,5-diaminopentane, neopentanediamine, hexamethylenediamine and the like, at elevated temperatures with the elimination of water and removing the excess diamine by distillation under reduced pressure.

These polyamines need not have a low, defined molecular weight, but can in fact be oligomeric or polymeric with molecular weights of not more than 3,000. Examples of this type of polyamine are diamines which can be prepared by reductive cyanoethylation of such polyols as polytetrahydrofuran. Products of this type contain terminal primary amino groups in the form of aminopropoxy groups. They can also contain some OH groups.

A further group of oligomeric or polymeric polyamines which have molecular weights of not more than 3,000 and which are suitable for use as component (a) are epoxy/amine adducts which contain, per molecule, on average two or more primary amino groups, together with OH groups. They can be prepared in, essentially, two ways:

The first way involves reacting epoxy resins with excess primary diamines and then separating off the excess diamine at elevated temperatures and under reduced pressure.

Examples of epoxy resins suitable for this reaction are polyglycidyl ethers of polyphenols, for example 2,2-bis-(4-hydroxyphenyl)-propane, 1,1-bis-(4-hydroxyphenyl)-ethane, bis-(4-hydroxyphenyl)-methane, bis-(2-hydroxynaphthyl)-methane and the like, which have been prepared by etherifying the said polyphenols with epichlorohydrin in the presence of alkali, polyglycidyl ethers of polyhydric alcohols obtained by the corresponding reaction of epichlorohydrin with polyhydric alcohols, such as ethylene glycol, diethylene glycol, triethylene glycol, propane-1,2-diol, propane-1,3-diol, pentane-1,5-diol, 2,2-bis-(4-hydroxycyclohexyl)-propane, glycerol, trimethylolpropane, pentaerythritol and the like, N,N-diglycidyl derivatives of heterocyclic nitrogen compounds, and triglycidyl isocyanurate.

To ensure that the coatings are sufficiently flexible, it can be advantageous to modify said epoxy resins, before their reaction with amines, with less than equivalent amounts of long-chain polyfunctional alcohols or mercaptans.

It is also possible to obtain a degree of flexibilization by using likewise less than equivalent amounts of long-chain di-sec.-amines, for example the diamide from dimeric fatty acid and 2-(2-hydroxyethylamino)-ethylamine. In this case, flexibilization and reaction with amine can be carried out at the same time.

Suitable diamines are here especially of 2 to 6 carbon atoms, eg. ethylenediamine, 1,2- and 1,3-diaminopropane, 1,4-diaminobutane, neopentanediamine and hexamethylenediamine. The reaction products, unless previously flexibilized, can be chain-lengthened with dicarboxylic acids, for example with sebacic acid or dimeric fatty acid. The desired molecular weight can be set via the ratio of dicarboxylic acid to epoxy/amine adduct, for example by employing 1 mole of dimeric fatty acid per two molecules of epoxy/amine adduct.

The second way of preparing this type of epoxy/amine adduct is to react said epoxy resins with secondary amines which contain blocked primary amino groups. Examples of such amines are the diketimine of diethylenetriamine, the ketimine of aminoethylethanolamine, the ketimine of N-aminoethylpiperazine and the ketimine of N-methylethylenediamine. The ketimines can be prepared in a simple manner from the free amines and a ketone, for example methyl isobutyl ketone, namely by separating water out of the refluxing mixture. In the reaction with epoxy resins only the secondary amino group reacts, and subsequently the ketimine can be cleaved simply by adding water to re-form the free primary amino group. These products too can be flexibilized by reacting some of the primary amino groups with dicarboxylic acids to lengthen the chain.

Examples of cyclic carbonic acid esters suitable for use as component (b) are ethylene carbonate, propylene carbonate, isobutylene carbonate, butylene carbonate and the like. They can be obtained in a simple manner by reacting the corresponding epoxies with carbon dioxide.

Component (a) is reacted with component (b) either in the absence of a solvent or in the presence of suitable solvents, eg. water, alcohols, ethers, esters, ketones, halohydrocarbons, aromatic hydrocarbons and aliphatic hydrocarbons. The reactants should be completely or substantially soluble in the solvents or solvent mixtures used, which in turn should not contain any primary or secondary amino group or mercapto group, since they can also react with the cyclic carbonic acid esters. The preferred solvents are water, alcohols and ether-alcohols, eg. methanol, ethanol, propanols, butanols and monoethers of diols, for example ethylene glycol, diethylene glycol, propylene glycol or dipropylene glycol with the monoalkanols mentioned first.

Components (a) and (b) are generally reacted with each other at 0°–80° C., preferably 15°–40° C. In a particularly preferred embodiment of the invention, the reactants are mixed at room temperature, and the mixture is left to stand until the necessary decrease in the amine number has taken place. This reaction takes from about 1 to about 48 hours.

To prepare the surface-coating agents according to the invention, components (A) and (B) are mixed with each other. If the components are of low viscosity, the mixing can take place in the absence of a solvent, if appropriate by heating the mixture to not more than 130° C. Before relatively viscous products are mixed with each other, they are dissolved in a conventional organic solvent, eg. an alcohol, ketone, ester, ether, hydrocarbon or the like.

The surface-coating agents according to the invention can be processed, together with soluble dyes, fillers, pigments or the like, by a conventional method into organically dissolved finishes which can additionally contain additives customary in surface-coating technology, such as leveling agents, defoamers, wetting agents, hardening catalysts and, in minor amounts, additional crosslinking agents and further binders.

They can be applied by a conventional method, such as brushing, knife-coating, spraying, roller-coating, casting or printing. They are preferably applied by some form of paint-spray technique, either using a compressed-air spray gun or on an electrostatic unit.

Baking generally takes place at 130°–200° C., preferably at 150°–180° C., in the course of 20–30 minutes if hardening catalysts are used.

Preferred hardening catalysts are tin compounds, eg. dibutyl-tin dilaurate, dibutyl-tin oxide, tin acetate and the like. Also suitable are lead compounds, eg. lead naphthenate, lead octoate or lead acetate. Hardening catalysts are added in amounts of from 0.5 to 4% by weight, preferably from 1 to 2.5% by weight, based on the surface-coating binder.

To prepare powder finishes, components (A) and (B) which are both solid and whose softening points should in each case be >60° C., in order to avoid blocking, are dry-milled and mixed with customary additives, such as pigments, fillers and, in minor amounts, hardening catalysts and leveling agents, for example polyacrylate-based. The mixtures are then homogenized at about 100° C. in the melt (for example in an extruder). After the extrudates have cooled down to room temperature they are thoroughly milled. Particle size fractions below about 90 μm are classified out by sieving and are used in the powder finish. The coarser fractions (above 90 μm) are reused in further millings.

The powder finishes are customarily applied by electrostatic powder spraying. The baking conditions are the same as those for the conventional surface-coating finishes.

If the above powder finishes are subsequently wet-milled in water until a particle size of <10–20 μm has been reached, this gives stable aqueous powder suspensions which can be applied and baked like the above conventional finishes. They too are preferably applied by some form of paint spraying, whether by means of compressed-air spray guns or on an electrostatic unit.

The use of epoxy/amine adducts as component (A) in the surface-coating agents according to the invention renders these agents water-soluble or dispersible on protonation with acids, and they can thus be used as cathodic electrocoating binders.

The electropaints are prepared by a conventional method. The neutralizing agent used is an inorganic or organic acid, such as formic acid, acetic acid, lactic acid or phosphoric acid, carboxylic acids being preferred. They are added in such amounts that the resulting bath has pH 6.5–8.0, preferably pH 7.0–7.5, in order to avoid corroding the electrocoating equipment. The baths can also contain further customary additives, such as pigments, fillers, leveling agents, wetting agents, surfactants and, in minor amounts, additionally other surface-coating binders and/or crosslinking agents.

In this case too, it is generally advantageous to use the surface-coating binders according to the invention together with hardening catalysts of the type and amount already described above for their use in conventional finishes.

In this form, the surface-coating agents according to the invention can be used for surface-coating any desired electrically conductive substrate, for example iron which may have been chemically pretreated, for example phosphatized, aluminum, copper and the like.

The deposition voltages are generally 50–500 V, preferably 150–350 V. The deposited surface coatings have to be hardened under baking conditions as already specified in the description of conventional systems.

The following Examples illustrate the invention without limiting its scope. Parts and percentages are by weight, unless indicated otherwise.

EXAMPLE 1

Example 1 describes the preparation of an organically dissolved baking finish which contains a polyacrylate resin as component (A).

(a) Preparation of the polyacrylate resin 800 parts of N-butyl acetate are introduced into a flask which has been equipped with a stirrer, a reflux condenser and an internal thermometer and are heated with stirring to 100° C. under nitrogen. Feed I comprising 520 parts of butanediol monoacrylate, 610 parts of tert.-butyl acrylate, 660 parts of N-butyl acrylate, 200 parts of methyl methacrylate and 10 parts of acrylic acid, and feed II comprising 540 parts of N-butyl acetate and 50 parts of azobisisobutyronitrile are then added dropwise at 100° C. in the course of 4 and 6 hours respectively. The resulting 60% strength solution of the polyacrylate resin in N-butyl acetate has a Fikentscher K value of 24 (3% strength in dimethylformamide), an acid number of 1 mg of KOH/g and an OH number of 98 mg of KOH/g.

(b) Reaction product of trisaminoethylamine and isobutylene carbonate

A 20% strength solution of 2,522 parts of isobutylene carbonate in ethanol is added at room temperature with stirring to a 50% strength solution of 1,000 parts of trisaminoethylamine in ethanol. After the exothermic reaction (not more than 40° C.) has died down, the mixture is left to stand at room temperature for 48 hours.

(c) Preparation of the organically dissolved baking finish

A mixture of 214 parts of iron oxide yellow, 107 parts of the amide of 1,9-anthrapyrimidine-2-carboxylic acid and anthraquinolylamine and 107 parts of titanium dioxide and a mixture of 1,000 parts of the acrylate resin of Example 1(a), 514 parts of the reaction product of Example 1(b), 17 parts of dibutyl-tin dilaurate and 329 parts of ethylene glycol monoethyl ether are made into a paste which is milled in a stirred ball mill containing 2,100 parts of glass beads (diameter: 2 mm) until a DIN 53,203 particle size of <10 μm has been reached. The grinding medium is separated off to leave a 55% strength yellow finish.

This finish is diluted with a small amount of N-butyl acetate to a DIN 4 cup efflux time of 30 seconds and is sprayed onto steel panels in the form of a film which is air-dried at room temperature for 5 minutes and is then baked at 160° C. in the course of 20 minutes. Rubbing the baked films 50 times forwards and backwards with a cottonwool pad impregnated with methyl isobutyl ketone produces no sign of attack.

| Film thickness: | 30 μm |
| --- | --- |
| Gloss 60°: | 83% |
| Konig pendulum hardness: | 120 seconds |
| Erichsen deep-drawing: | 10 mm |

EXAMPLE 2

Example 2 describes the preparation of an organically dissolved baking finish which contains a polyester, specifically an alkyd resin, as component (A).

(a) Preparation of the alkyd resin

In a flask which has been equipped with a stirrer, a water separator and an internal thermometer, a mixture of 1,100 parts of ricinenic acid, 666 parts of phthalic anhydride, 828 parts of trimethylolpropane, 1 part of hypophosphorous acid and 62 parts of an aromatic gasoline fraction (boiling range: from 185 to 206° C.) is heated under nitrogen at 200°–220° C. until it has condensed to an acid number of about 20 mg of KOH/g. When cooled down, the residue is taken up in 880 parts of isobutanol.

| Solids content: | 75% |
| --- | --- |
| OH number: | 149 mg of KOH/g |

(b) Preparation of the organically dissolved baking finish

A mixture of 375 parts of iron oxide yellow, 187.5 parts of the amide of 1,9-anthrapyrimidine-2-carboxylic acid and anthraquinolylamine and 187.5 parts of titanium dioxide and a mixture of 1,000 parts of the alkyd resin of Example 2(a), 272 parts of xylene, 1,500 parts of the reaction product of Example 1(b), 30 parts of dibutyl-tin dilaurate and 250 parts of ethylene glycol monoethyl ether are made into a paste which is milled in a stirred ball mill containing 3,300 parts of glass beads (diameter: 2 mm) until a DIN 53,203 particle size of <10 μm has been reached. The grinding medium is separated off to leave a 60% strength yellow finish.

This finish is diluted with a small amount of xylene to a DIN 4 cup efflux time of 30 seconds and is sprayed onto steel panels in the form of a film which is air-dried at room temperature for 5 minutes and is then baked at 180° C. in the course of 20 minutes. Rubbing the baked films 50 times forwards and backwards with a cottonwool pad impregnated with methyl isobutyl ketone produces no sign of attack.

| Film thickness: | 25 μm |
| --- | --- |
| Gloss 60°: | 85% |
| Konig pendulum hardness: | 164 seconds |
| Erichsen deep-drawing: | 6.2 mm |

EXAMPLE 3

Example 3 describes the preparation of an organically dissolved baking finish which contains an epoxy/amine adduct as component (A) and which is useful, for example, as a filler for automotive surface coatings.

(a) Preparation of a flexibilized epoxy resin 1,455 parts of a commercially available polyglycidyl ether of 2,2-bis-(4-hydroxyphenyl)-propane with an epoxide equivalent weight of 485 are reacted with 412.5 parts of a commercially available polycaprolactonediol having an OH equivalent weight of 275 in the presence of 120 parts of xylene and 4.5 parts of dimethylbenzylamine in the course of about 2 hours at 130° C. The epoxide equivalent weight is then 1,070. The resin is diluted with 504 parts of isobutanol to a 75% solids content and is then immediately used as described in 3(c).

(b) Preparation of a ketimine of methyl isobutyl ketone and N-aminoethylpiperazine 387 parts of N-aminoethylpiperazine and 511 parts of methyl isobutyl ketone are heated together. 54 parts of water are separated off within a temperature range from 113° to 147° C. in the course of 3½ hours. This gives an about 75% strength solution of the desired ketimine in methyl isobutyl ketone.

(c) Preparation of the epoxy/amine adduct 489 parts of the ketimine of Example 3(b), (75% strength solution) are added to 2,480 parts of the flexibilized epoxy resin prepared in Example 3(a) (75% strength solution), and the mixture is heated at 100° C. for 2 hours, during which the epoxide value drops to 0. 100 parts of water are then added at 120° C. to hydrolyze the ketimine. The mixture, to which further water is added if necessary, is then distilled until no more methyl isobutyl ketone passes over. The residue is then diluted with isobutanol to a solids content of 65%.

Höppler viscosity (50% strength in ethylene glycol monobutyl ether at 20° C.): 4,700 mPa.s.

(d) Preparation of the organically dissolved baking finish

A mixture of 1,065 parts of the epoxy/amine adduct prepared in Example 3(c), 600 parts of the reaction product of Example 1(b), 20 parts of dibutyl-tin dilaurate and 350 parts of ethylene glycol monoethyl ether and a mixture of 891 parts of titanium dioxide and 9 parts of carbon black are made into a paste which is milled in a stirred ball mill containing 2,000 parts of glass beads (diameter: 2 mm) until a DIN 53,203 particle size of about 10 μm has been reached. The grinding medium is separated off to leave a 65% strength finish which is knife-coated onto steel panels in the form of a film which is 100 μm thick when wet and which is baked at 160° C. in the course of 20 minutes to give coatings which show no sign of attack after being rubbed 50 times forwards and backwards with a cottonwool pad impregnated with methyl isobutyl ketone.

| | |
|---|---|
| Film thickness: | 25 μm |
| Gloss 60°: | 86% |
| Konig pendulum hardness: | 178 seconds |
| Erichsen deep-drawing: | 6.5 mm |

EXAMPLE 4

Example 4 describes the preparation of a powder finish which contains an epoxy/amine adduct as component (A).

(a) Preparation of the epoxy/amine adduct 400 parts of hexamethylenediamine are heated to 80° C. An 80% strength solution of 400 parts of a commercially available polyglycidyl ether based on 2,2-bis-(4-hydroxyphenyl)-propane and having an epoxide equivalent weight of 485 in toluene is then added. Following an initially exothermic phase, the reaction is completed at 100° C. in the course of 30 minutes. Excess hexamethylene diamine and toluene are then distilled off at an internal temperature which reaches 180° C. The remaining traces of hexamethylenediamine are removed in a thin-film evaporator at 180° C. under 0.25 mbar. The resin solidified on cooling. The amine number is 169 mg of KOH/g.

(b) Reaction product of diaminodicyclohexylmethane and ethylene carbonate

A 50% strength solution of 880 parts of ethylene carbonate in ethanol is added at room temperature with stirring to a 50% strength solution of 1,070 parts of 4,4′-diaminodicyclohexylmethane in ethanol. The mixture is heated at 40° C. for 8 hours. The crystals of bis-hydroxyethyl carbamate which precipitate on cooling are filtered off with suction, washed with a little cold ethanol and dried.

(c) Preparation of the powder finish

A mixture of 1,500 parts of the epoxy/amine adduct prepared in Example 4(a), 1,500 parts of bis-hydroxyethyl carbamate as prepared in Example 4(b), 30 parts of dibutyl-tin oxide, 812 parts of titanium dioxide and 203 parts of bone black is coarse-milled under dry conditions. 15 parts of poly(2-ethylhexyl acrylate) are added as a flow improver, and the mill base is melt-homogenized at 90°–95° C. in an extruder. When the extrudates have cooled down, they are fine-milled, and the fractions with a particle diameter less than 90 μm are sieved out. The coarser fractions return into the milling process. The black powder finish obtained in this way and having a particle size <90 μm is applied to steel panels by electrostatic powder spraying and baked thereon at 180° C. in the course of 30 minutes into coatings which exhibit good leveling and show no sign of attack when rubbed 50 times forwards and backwards with a cottonwool pad impregnated with methyl isobutyl ketone.

| | |
|---|---|
| Film thickness: | 70 μm |
| Gloss 60°: | 65% |
| Konig pendulum hardness: | 180 seconds |
| Erichsen deep-drawing: | 2.1 mm |

EXAMPLE 5

Example 5 describes the preparation of a cathodic electropaint which contains a chain-lengthened epoxy/amine adduct as component (A).

(a) Preparation of the chain-lengthened epoxy/amine adduct 1,045 parts of the epoxy/amine adduct prepared in Example 4(a) are reacted with 157 parts of dimeric fatty acid at 170°–195° C. in 97 parts of xylene until the elimination of water is complete. The resin formed is diluted with 49 parts of ethylene glycol monobutyl ether and 365 parts of isobutanol.

(b) Reaction product of an epoxy/amine adduct and ethylene carbonate

A 70% strength solution in ethanol is prepared of 1,020 parts of the epoxy/amine adduct prepared in Example 4(a). 200 parts of a 50% strength solution of ethylene carbonate in ethanol are then added at room temperature, and the mixture is left to stand at room temperature for one week.

(c) Preparation of the cathodic electropaint 1,000 parts of a 10% strength aqueous dispersion are prepared from 72 parts of the epoxy/amine adduct prepared in Example 5(a), 75 parts of the reaction product prepared in Example 5(b), 2 parts of dibutyl-tin dilaurate, 3 parts of acetic acid and water and are admixed with 66 parts of a pigment paste prepared as follows:

PIGMENT PASTE 273 parts of the epoxy/amine adduct prepared in Example 3(a), 15 parts of lactic acid, 86 parts of ethylene glycol monobutyl ether, 325 parts of titanium dioxide, 50 parts of kaolin, 21 parts of basic lead silicate, 5.5 parts of carbon black and 423 parts of water are milled in a stirred ball mill also containing 1,200 parts of glass beads (diameter: 2 mm) until a DIN 53,203 particle size of <10 μm has been reached. The glass beads are separated off to leave a gray paste having a solids content of 50.5%.

The electropaint is at pH 8.3. It is aged at 28° C. for a day and is deposited at a deposition voltage of 240 volt onto zinc-phosphatized steel panels for 2 minutes at a time. The wet films rinsed with water and blown dry with air are baked at 180° C. for 20 minutes.

| Properties | |
|---|---|
| Film thickness: | 18 μm |
| Reverse impact: | 160 in × lb |
| Solvent resistance (50 rubs forwards and backwards with a cottonwool pad impregnated with methyl isobutyl ketone): | no sign of attack |
| 480 hours' exposure to ASTM salt spray test (rust bleeding at the crack): | 0.8 mm |
| Ford throwing power: | 20 cm |

We claim:

1. A heat-curable surface-coating agent which contains, as a binder, a mixture of (A) from 1 to 90% by weight of a polyadduct, polycondensate or other polymer which has an average molecular weight $\overline{M}_n$ of from 500 to 10,000 and, per molecule, on average two or more OH or primary or secondary amino groups, or two or more OH, primary and secondary amino groups, or two or more OH and primary or secondary amino groups, or two or more primary and secondary amino groups, and (B) from 99% to 10% by weight of a reaction product of (a) one or more aliphatic, cycloaliphatic or araliphatic polyamines which on average contain two or more prior without hydroxyl mary amino groups per molecule, with groups, and (b) from 75 to 200 mole %, based on the primary amino groups of component (a), of one or more cyclic carbonic acid esters of the formula (I)

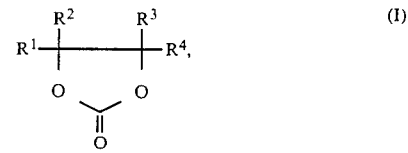

where $R^1$, $R^2$, $R^3$ and $R^4$ are identical or different and each is hydrogen, methyl or ethyl.

2. A surface-coating agent as defined in claim 1, which contains a polyester as component (A).

3. A surface-coating agent as defined in claim 1, which contains a polyacrylate as component (A).

4. A surface-coating agent as defined in claim 1, which contains, as component (A), a polyadduct which carries basic nitrogen groups and, bonded to aromatic rings, groups of the formula (II)

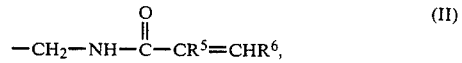

where $R^5$ and $R^6$ are identical or different and each is hydrogen or methyl.

5. A surface-coating agent as defined in claim 1, which contains, as component (A), a reaction product of phenolic Mannich bases and 1,2 epoxy resins.

6. A surace-coating agent as defined in claim 1, which contains, as component (A), a reaction product of one or more aromatic or aliphatic 1,2 epoxy resins and one or more primary or secondary amines.

7. A surface-coating agent as defined in claim 1 or 2 or 3 or 4 or 5 or 6, which is water-dilutable on partial or complete neutralization with an acid.

8. An aqueous cathodic electrocoating bath which contains 5–30% by weight of a surface-coating agent as defined in claim 7.

* * * * *

UNITED STATES PATENT AND TRADEMARK OFFICE
CERTIFICATE OF CORRECTION

PATENT NO. : 4,543,376
DATED : September 24, 1985
INVENTOR(S) : Eberhard SCHUPP et al.

It is certified that error appears in the above—identified patent and that said Letters Patent is hereby corrected as shown below:

IN THE CLAIMS:

Claim 1, line 39, should read:

--two or more primary amino groups per molecule, with or without hydroxy groups, and (b) from 75 to --.

Signed and Sealed this

Fourth Day of March 1986

[SEAL]

Attest:

DONALD J. QUIGG

Attesting Officer

Commissioner of Patents and Trademarks